United States Patent [19]

Watanabe

[11] 4,175,692
[45] Nov. 27, 1979

[54] ERROR CORRECTION AND DETECTION SYSTEMS

[75] Inventor: Yutaka Watanabe, Hadano, Japan

[73] Assignee: Hitachi, Ltd., Japan

[21] Appl. No.: 863,089

[22] Filed: Dec. 22, 1977

[30] Foreign Application Priority Data

Dec. 27, 1976 [JP] Japan ............................ 51-156536

[51] Int. Cl.² ........................ G06F 11/12; G11C 29/00
[52] U.S. Cl. ................................................. 235/312
[58] Field of Search ............... 235/312; 340/146.1 AL

[56] References Cited

U.S. PATENT DOCUMENTS

| | | | |
|---|---|---|---|
| 3,648,238 | 3/1972 | Yarrington | 340/146.1 AL |
| 3,688,265 | 8/1972 | Carter et al. | 340/146.1 AL |
| 3,825,893 | 7/1974 | Bossen et al. | 340/146.1 AL |
| 3,949,208 | 4/1976 | Carter | 235/312 |
| 4,030,067 | 6/1977 | Howell et al. | 235/312 |
| 4,037,091 | 7/1977 | Beuscher | 235/312 |
| 4,045,779 | 8/1977 | Markle | 235/312 |

*Primary Examiner*—Charles E. Atkinson
*Attorney, Agent, or Firm*—Craig and Antonelli

[57] ABSTRACT

An error correction and detection system is capable of detecting a miscorrection caused by a triple bit error by using SEC-DED code and is adapted to correct a single bit error and detect a double bit error. When the single bit error is detected from the SEC-DED code read out from a memory, the code is subjected to a retrial process after correction of the error, wherein the corrected SEC-DED code is rewritten in the memory after inversion of the polarity thereof and is read out therefrom. The code read out from the memory undergoes again an error checking process after inversion of the polarity thereof. Repeated detection of an error indicates that the first correction was a miscorrection as caused by the triple bit error.

6 Claims, 1 Drawing Figure

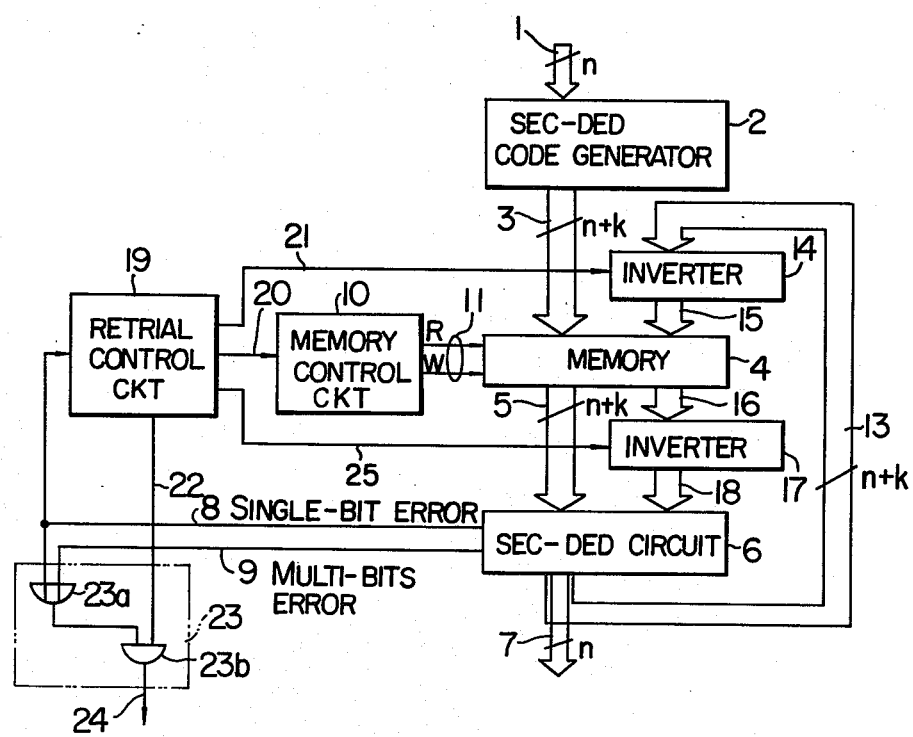

ERROR CORRECTION AND DETECTION SYSTEMS

LIST OF PRIOR ART REFERENCES (37 CFR 1.56(a))

The following references are cited to show the state of the art:
1. R. W. Hamming "Error Detecting and Error Correcting Codes" The Bell System Technical Journal Vol. XXVI, No. 2, pp. 147-160, April 1950.
2. U.S. Re. Pat. No. 23601 to R. W. Hamming et al.
3. M. Y. Hsiao "A Class of Optimal Minimum Odd-weight-column SEC-DED Codes" IBMJ. RES. DEVELOP July 1970, pp. 395-401.
4. U.S. Pat. No. 3,436,734 to James H. Pomerene et al.
5. U.S. Pat. No. 3,582,878 to Douglas C. Bossen et al.
6. U.S. Pat. No. 3,656,107 to M. Y. Hsiao et al.
7. U.S. Pat. No. 3,893,071 to Douglas C. Bossen et al.

BACKGROUND OF THE INVENTION

The present invention relates to an error correction and detection system for a memory or storage device employed in an electronic computer or the like. In more particular, the invention relates to an error correction and detection system capable of detecting and correcting errors of 1 (m) bit and capable of detecting errors of multi-bits (more than m+1).

As an attempt to increase the reliability of memory devices, there has been used in practice an error detecting and correcting system in which so-called Hamming codes are adopted for allowing a single bit error to be detected and corrected and a double bit error to be detected. Such code is herein referred to as SEC-DED code as an abridgement form in capital letters of Single bit Error Correction - Double bit Error Detection, although the same code is sometimes referred to simply as ECC code, an abridgement of Error Check and Correction. The principle of SEC-DEC codes are fully discussed by R. W. Hamming in his article under the title "Error Detecting and Error Correcting Codes" in "The Bell System Technical Journal," Vol. XXVI, No. 2, pp. 147-160, April 1950 and also well known from U.S. Pat. No. Re. 23,601 to R. W. Hamming et al under the title "ERROR-DETECTING AND CORRECTING SYSTEM."

The principle of SEC-DEC code will be briefly reviewed. When the SEC-DED code is composed of n inherent information (data) bits in combination with $k'$ redundant bits for error correction, the following conditions must be satisfied in order to identify the position at which the correction is required (one of $n+k'$ positions) and detect the presence or absence of error. Namely, $$2^{k'} - (n + k' + 1) \geq 0 \quad (1)$$

If one additional redundant bit is used for detecting the double bit error, the total number k of the redundant bits is equal to $k'+1$. Accordingly, the expression (1) can be rewritten as follows:

$$2^{k-1} - (n+k) \geq 0 \quad (2)$$

Hence, it is apparent that the total number k of the redundant bits will amount to 8 bits for the data of 64 bits (n=64).

In a practical system operative on the basis of the above principle, a write-in data of n bits is supplied to a SEC-DED code generator circuit, at which the write-in data is added with k redundant bits, whereby a write-in SEC-DED code is produced. The number of bits of this code is thus equal to n+k. The coded information containing the write-in data may then be written in a memory device. For the reading-out operation, the information as read out from the memory is a read-out SEC-DED code containing the data. The read-out information code is fed to a SEC-DED circuit in which correction of a single bit error as well as detection of double bit error are made. If a single bit error has been produced within the memory, the SEC-DED circuit detects such a single bit error, to thereby switch on a single bit error detection line for signalling an alarm signal to an operator and at the same time to correct the error bit to a correct value. When a multi-bit error greater than a double bit error, inclusive, has been produced, detection of the error is made in a similar manner and an associated multi-bit error detection line is turned on to signal an alarm. In this way, n-bits output from the SEC-DED circuit can be utilized as correct data when no error is produced within the memory or the error is a single bit.

On the other hand, when a double or more-bit error has been produced, a read-out data output from the SEC-DED circuit represents false information. For an error of 2 bits, an alarm can be produced with a probability of 100%. For an error of more than 3 bits, an alarm may be produced with a certain degree of reliability. In other words, although the generation of a double bit error can be detected without fail, perfect detection can not be expected for a multi-bit error containing 3 or more bits. Such situation is also described by Y. Hsiao in his article "A Class of Optimal Minimum Odd-weight-column SEC-DED Codes" of "IBM J. RES. DEVELOP," July 1970, pp. 395-401 (refer in particular to page 398, right column, lines 35 to 42). In such a case, the triple bit error is determined as if a single bit error were produced, whereby a miscorrection is performed. The probability of mistaking the triple bit error for a single bit error is considered generally on the order of 50 to 75%. Alternatively saying, more than half the miscorrections are processed as corrections. This is of course intolerable in a computer imposed with high reliability and accuracy requirements.

To deal with such an inconvenience, M. Y. Hsiao has introduced in the article referred to above an encoding method according to which the probability of miscorrection of the triple bit error can be reduced to a more reasonable degree.

Further, there has been proposed a system in which an undefined-bit marker circuit is added to the SEC-DED circuit for the purpose which will be mentioned below. As can be seen from the equation (2), 8 redundant bits (i.e. k=8) are required for data of 64 bits (i.e. n=64). Saying inversely, when 8 bits (k=8) are allotted for the redundant bits, the number n of the data bits may be employed up to 120 (n=120). Among the total bits of 128 in number for k=8 (i.e. n+k=128), 72 bits which are actually used are referred to as definition bits, while the remaining 56 bits are referred to as undefined bits. When a single bit error was produced, the position at which the error bit is located as detected by the SEC-DED circuit is necessarily that of a definition bit. However, where a triple bit error as produced was regarded as a single bit error, the error locations may be at positions both of the definition bits and the undefined bits. The undefined-bit marker circuit described above will be then supplied with an error bit position-designating information from the SEC-DED circuit to be examined with reference to the previously known undefined bits. With such an arrangement, it is possible to a certain degree that the triple bit error mistaken for the single bit error by the SEC-DED circuit is identified as the triple-bit error by the undefined-bit marker circuit. In other words, an error which was identified as the single-bit error in the SEC-DED circuit can be yet ascertained by the undefined bit marker circuit that the error is not in reality the single bit error.

The undefined-bit marker circuit is constituted by a combination of logic circuitries which serve for determining whether the bit as marked by the SEC-DED circuit is a previously known undefined bit or not and involves problems such as described below:

(1) A large amount of hardware is required for the function of the undefined-bit marker circuit.

(2) Circuit design of the undefined bit marker circuit has to be varied when correspondence between the definition bits and the selected ones among 128 bits is changed (in dependence on the encoding method as actually adopted).

(3) There is a case where the redundant bits are increased by serveral bits for improving the efficiency of marking that a single bit error is in reality a triple bit error with the aids of the undefined-bit marker circuit. For example, if the number k of the redundant bits is increased from 8 to 9 bits for the data bit number n being 64, then the number of the undefined bits is equal to $56+128=184$ bits. Thus, the probability of the error locations designated by the SEC-DED circuit being at positions of the undefined bits will be increased in the case where the triple bit error produced in reality was erroneously determined to be a single bit error. Consequently, the efficiency of marking such false determination can be certainly enhanced. However, this is possible only with a much more complicated circuit arrangement of the unknown bit marker circuit.

In addition to the problems described above, it should be noted that provision of the undefined-bit marker circuit at the expense of technical and economical expenditure can not assure all the false determinations of the triple bit errors being erroneously identified as the single bit errors may be completely marked to be excluded. Of course, when no undefined-bit marker circuit is provided, miscorrection will be made with a probability of 50 to 75%, as described hereinbefore. The undefined-bit marker circuit will be capable of repairing only about 45% of such miscorrections. Thus, as a whole, erroneous processing will be carried out once for every three times.

U.S. Pat. No. 3,436,734 to James H. Pomerene et al titled "ERROR CORRECTING AND REPAIRABLE DATA PROCESSING STORAGE SYSTEM" discloses a method of packing the individual bits forming words in different packages with an attempt to reduce the probability of occurrence of a triple bit error.

Further, U.S. Pat. No. 3,582,878 to Douglas C. Bossen et al entitled "MULTIPLE RANDOM ERROR CORRECTING SYSTEM," U.S. Pat. No. 3,656,107 to Mu-Yue Hsiao et al entitled "AUTOMATIC DOUBLE ERROR DETECTION AND CORRECTION APPARATUS," as well as U.S. Pat. No. 3,893,071 to Dougas C. Bossen et al entitled "MULTI-LEVEL ERROR CORRECTION SYSTEM FOR HIGH DENSITY MEMORY" disclose systems in which the number k of redundant bits employed usually in SEC-DED circuits is increased (e.g. 9 or more redundant bits for 64 data bits) thereby to allow the double or more bit error not only to be detected but also to be corrected.

Although these known methods are of great significance for enhancing the reliability, it is yet impossible to eliminate completely the miscorrections.

SUMMARY OF THE INVENTION

Accordingly, an object of the invention is to provide an error correction and detection system which is capable of detecting positively miscorrections such as described above.

Another object of the invention is to provide an error correction and detection system which is capable of detecting an erroneous status with a high accuracy.

Error correction and detection means are employed for detecting presence or absence of errors in the data bits and the redundant bits of information read-out from a memory. In the case of an SEC-DED code containing a minimum number k of the redundant bits for satisfying the equation (2) described hereinbefore for n data bits, the error correction and detection means performs a correction for a single bit error as detected and indicates that the error is the single-bit error. In the case of the a double or more-bit error, the error correction and detection means indicates the presence of the multi-bit error. However, there is a possibility that the corrections of errors detected as the single bit error would include miscorrections due to the triple bit error as described hereinbefore.

According to the teaching of the invention, there is provided a re-trial means which is operative in response to the indication of the single-bit error from the error correction and detection means to re-write in a memory the inverted data bits and redundant bits after the correction of the error. The data and redundant bits are again read out from the memory and supplied to the error correction and detection means after having been inverted. This process is referred to as the retrial. When no error is detected in the data bits and the redundant bits after the retrial, it is determined that the previous detection and correction of the single bit error have been correctly made. On the other hand, if an error is again detected after the trial process, it is determined that the error previously detected as the single bit error was false and in reality a triple-bits error regardless of whether the error detected in the retrial process is of a single- or multi-bit.

According to the invention, the miscorrection made on the triple bit error mistaken for the single bit error can be positively detected. This means that the status of the error, i.e. the single bit error or alternatively multi-bit error can be detected accurately.

The teachings of the invention can be applied in general to any codes which are capable of correcting errors of m bits and detecting errors of (m+1) or more bits in a completely similar manner as the code for correcting the single bit error and detecting the double- or more-bits error described hereinbefore. In the equation (2) discussed hereinbefore, the addition of 13 redundant bits (i.e. k=13) to 64 data bits (i.e. n=64) will permit the correction of the double bit error and the detection of the triple- or more-bit error. In this case, the possibility of miscorrections can be also detected in accordance with the teachings of the invention in a similar manner as is in the case of the SEC-DED codes.

BRIEF DESCRIPTION OF THE DRAWING

The single FIGURE is a block diagram illustrating an embodiment of the invention.

DESCRIPTION OF THE PREFERRED EMBODIMENTS

Referring to the FIGURE, there is schematically illustrated an embodiment of a system for processing SEC-DED codes for correcting a single bit error and detecting a double or more bit error.

Memory 4 is controlled with respect to read-out and write-in operations by a memory control circuit 10 through associated drive lines generally denoted by reference numeral 11. Data 1 to be written into the memory 4 consists of n bits and at first is supplied to a SEC-DED code generator circuit 2, in which the data is added with k redundant bits in accordance with the principle of the Hamming code. The output from the SEC-DED code generator circuit is thus a write-in SEC-DED code 3 the bit number of which is equal to n+k. Coded information including the write-in data is written in the memory 4.

The information read-out from the memory 4 is a read-out SEC-DED code 5 containing the data 1. The read-out SEC-DED code is fed to a SEC-DED circuit 6 which performs correction of the single bit error and detection of the double bit error. More specifically, when a single bit error has been produced within the memory 4, the error is detected to drive a single bit error detection line 8 for generation of an alarm and concurrently corrected to the correct bit value.

When a multi-bit error larger than a double bit error, inclusive thereof, is detected, a multi-bit error detection line 9 is turned on to signal an alarm to the operator. However, at this time, correction of the error is not made since no indication of the error bit position is available.

A re-trial control circuit 19 is activated by a single bit error signal from the SEC-DED circuit 6 through the single bit error detection line 8. At the same time, the read-out data along with the redundant bits having been corrected is applied to a polarity inverter circuit 14 as a retrial SEC-DED code 13. Since the polarity inverter 14 is activated through an inverter control line 21 coupled to the re-trial control circuit 19, the re-trial SEC-DED code is input again in the memory 4 as the re-write-in SEC-DED code obtained from the output of the polarity inverter 14. The rewrite-in SEC-DED code will drive a memory control circuit 10 under the control of a memory control line 20 coupled to the output of the re-trial control circuit 19 and is written in the memory 4 through the write-in drive line 11 and is again read-out therefrom through the read-out drive line 11 as the twice-read-out SEC-DED code 16, which is then input to another polarity inverter 17. Since the polarity inverter 17 is activated through an inverter control line 25 coupled to the re-trial control circuit 19, the polarity of the twice-read-out information is inverted and applied to the SEC-DED circuit 6 as the code denoted by reference numeral 18. The SEC-DED circuit 6 operates to detect an error of the input code 18 and to correct any error. The significance of this retrial process resides in the error detection rather than the error correction. Both of the single bit error detection line 8 and the multi-bit error detection line 9 from the SEC-DED circuit are connected to the input of an AND-gate 23b through an OR-gate 23a of a miscorrection detection circuit 23. In the re-trial mode, the AND-gate 23b is enabled by a signal fed from the re-trial control circuit 19 through a re-trial indicating line 22, so that the appearance of an error indicating signal on the line 8 or 9 from the SEC-DED circuit 6 during the retrial process will bring about the activation of the miscorrection detecting line 24. When the detection line 24 remains unactivated during the retrial process, it is determined that the correction made at the first time by the SEC-DED circuit 6 for the single-bit error was correct. On the other hand, when the line 24 is activated as described above, it is determined that the correction performed by the SEC-DED circuit was made on the triple bit error mistaken for the single bit error and thus was incorrect (i.e. miscorrection). In this manner, when an error was detected and corrected at the first time and no error was detected in the retrial process, then the n-bit data 7 output from the SEC-DEC circuit 6 can be utilized as correct data.

Next, description will be made of an example listed up in the following table.

Table

| | Types of Errors In a Memory (4) | Case 1 $\overline{C}$ = Solid Single bit error | Case 2 $\overline{B}$ = Solid triple bit error |
|---|---|---|---|
| First Time | Write-in SEC-DED code 3 | A + B + C | A + B + C |
| | Read-out SEC-DED code 5 | A + B + $\overline{C}$ | A + $\overline{B}$ + C |
| | Single bit error detecting line 8 | ON | ON |
| | Error bit position indicating information | C position | C position |
| | Retrial SEC-DED code 13 | A + B + C (Normal correction) | A + $\overline{B}$ + $\overline{C}$ (Miscorrection) |
| Second Time | Rewritten SEC-DED code 15 | $\overline{A}$ + $\overline{B}$ + $\overline{C}$ | $\overline{A}$ + B + C |
| | Twice-Read-Out SEC-DED code 16 | $\overline{A}$ + $\overline{B}$ + $\overline{C}$ | $\overline{A}$ + $\overline{B}$ + $\underline{C}$ |
| | Inverter Output 18 | A + B + C | A + B + $\overline{C}$ |
| | Error detecting line 8 or 9 | OFF | ON |

Table-continued

| Items | Types of Errors In a Memory (4) | Case 1 C = Solid Single bit error | Case 2 B = Solid triple bit error |
|---|---|---|---|
| | Error bit position indicating information | none | C position |
| | SEC-DED code after correction | A + B + C | A + B + C |
| Remarks | | A: code of 68 bits. B: code of 3 bits. C: code of 1 bit written C in memory and read out as C̄. | A: code of 68 bits. B: code of 3 bits written B in memory and read out as B̄. C: code of 1 bit. |

A certain error bit may exist in the memory which is written in with one polarity (for example "1") but read out with the opposite polarity ("0"). In most cases, however, when this error bit is written in with the opposite polarity ("0"), this is read out with the same polarity ("0") as this is written in. This applies and is true particularly in the case of a solid failure. Accordingly, when a single bit error is detected in a SEC-DED code and corrected appropriately, it can be expected that the SEC-DED code is made free from any error by writing the code in the memory after inversion of the polarity thereof inclusive of the false bit and, after having read out from the memory, supplying to the SEC-DED circuit with the polarity inverted.

On the other hand, when the triple bit error which has actually occured is erroneously taken for a single bit error and consequently the polarity of this single bit is inversed, the three actually erroneous bits would be rewritten in the memory with erroneous polarities upon writing-in of the whole SEC-DED code in the memory after the polarity inversion thereof. Accordingly, when the SEC-DED code is read out again and supplied to the SEC-DED circuit after the polarity inversion thereof, an error will be detected again.

In the Case 1 of the above table, it is assumed that 64 data bits plus 8 redundant bits, i.e. 72 bits are stored in the memory 4, wherein a single bit C written in the memory with one polarity is read out as C̄ with the other polarity inversed thereby to constitute a single bit error. The written-in SEC-DED code 3 is assumed to be represented by A+B+C. Then, the readout SEC-DED code 5 will be A+B+C̄, of which C̄ is a result of erroneous storage of C in the memory. Consequently, the single bit error detection line 8 is activated and position C is indicated as the error bit position. After the retrial process, the SEC-DED code is corrected to become A+B+C. Upon the retrial, the SEC-DED code 15 as re-written in the memory 4 is Ā+B̄+C. In other words, the bit C is re-written as C which is produced through the polarity inversion of C and gives rise to no error in the memory 4, since the other bits A and B will not involve error in either polarity thereof. The read-out SEC-DED code 16 will be at this time same as the written-in code Ā+B̄+C, which code is converted to A+B+C by the polarity inverter 17. Since this code includes apparently no error bit, the SEC-DED circuit 6 can detect no error. In this manner, the code having no more than a single bit error is determined as no-error code after the retrial process according to the invention.

In the Case 2 as listed up in the above table, it is assumed that 64 data bits plus 8 redundant bits, i.e. 72 bits in total are written in the memory 4, wherein triple bit code B written with the one polarity B is read out with the other polarity B̄ and detection is erroneously made as the single-bit error of C not withstanding of the triple bit or multi-bits error to be detected. More specifically, the written-in SEC-DED code 3 is represented by A+B+C and the read-out SEC-DED code is represented by A+B̄+C. However, an error is detected as a single bit error at the position of C, whereby miscorrection is made to produce the miscorrected code of A+B̄+C̄. The actually erroneous triple bit code term B̄ remains as it is with the erroneous polarity B. In other words, detection and correction were made as if the SEC-DED code contained a single bit error. Thus, after the re-trial processing, the SEC-DED code 15 written again in the memory will be Ā+B+C̄. Since no error is produced at A and C positions in the memory, the SEC-DED code 16 read-out again from the memory will be represented by Ā+B̄+C̄ with an error occurring again at the B position as was in the case of the first storage. This code 15 is inverted through the polarity inverter to become A+B+C̄ which is then input to the SEC-DED circuit 6. The circuit 6 will thus detect the single bit error at the position C. This detection means that the correction made on the SEC-DED code 5 in the first time as the single bit error was miscorrection. Thus, it is ascertained that the actually erroneous code term was a triple bit code.

In the above example, it is assumed that the errors are of a solid nature. However, there may arise different errors at the first and second storages in the memory. For example, assume that a code contains three bits which are likely to produce errors. Under such a condition, there may arise a triple bit error at the first storage in the memory, while at the second storage a double bit error may be detected. The system according to the invention is still effective in this case, because the error correction and detection circuit 28 according to the invention will activate the error correction and detection line 24 whenever a single bit error or double- or multi-bit error is detected after the retrial.

As will be appreciated from the foregoing description, the invention has solved perfectly such problem that a triple bit error of information containing redundant bits as produced in a memory is possibly processed as a single bit error thereby to involve disturbances in succeeding processings in a computer.

In the foregoing, description is made on the triple bit error. However, it will be appreciated that the teaching of the invention may be applied to the case where a plurality of errors each containing an uneven number of bits such as 5 bits, 7 bits and so forth are possibly processed as the single bit error.

Although the disclosed embodiment is arranged so that correction is made on the single bit error while detection is made on the double bit error, it will be appreciated that the teaching of the invention can be expanded and applied in general terms to the case where m-bit errors are corrected with an (m+1)-bit error being detected, since the increased number of m will merely require a correspondingly increased number of the redundant bits.

The invention thus eliminates utterly the problem of the hitherto known code systems such that the detection of miscorrection of processing erroneously triple or more-bit error of data and redundant bits as a single bit error cannot be realized in a satisfactory manner.

Further, the invention makes it unnecessary to employ the undefined bit marker circuit which has been employed in the hitherto known system. On the other hand, the circuits 14, 17, 19, 23 such as shown in FIG. 1 are needed for implementing the invention. However, since the function of such circuits can be realized with the aid of a microprogram stored in a computer, special hardware for this purpose may be unnecessary in most practical cases.

Additionally, the system according to the invention can be applied to any kind of encoding system, since the error correction and detection system of the invention is not susceptible to the influence of variation in codes.

Referring again to the table, it can be seen that the SEC-DED code is corrected properly despite the triple bit error in the Case 2. This means that even the triple bit error of the SEC-DED code can be corrected properly so far as the error produced in the memory is of a solid nature. Accordingly, the advantages of the invention are particularly remarkable when the invention is implemented in combination with a memory the individual elements of which are susceptible only to generation of the solid error. Thus, in the case of a conventional IC memory, a multi-bit error can be properly corrected according to the system of the invention. When data of which a multi-bit error has been corrected is provided as it is to subsequent data processing, there will still be some anxiety with respect to accuracy for the data processing system requiring a high reliability. In such a case, the corrected data may be subjected to an error analysis process thereby to confirm the proper correction of the error prior to the succeeding processings.

I claim:

1. A data error correcting and detecting system for correcting an m-bit error and for detecting an (m+1) or more bit error using a Hamming code comprising:

first means for receiving data and for generating a Hamming code comprising a prescribed number of redundant bits and data bits;

second means, coupled to said first means, for controllably storing said Hamming code;

third means, coupled to said second means, for correcting the bit error in said Hamming code and generating a first indication signal representative thereof in response to the bit error in said Hamming code being an m-bit or less error, and for generating a second indication signal in response to the bit error in said Hamming code being an (m+1) or more bit error;

fourth means, coupled to said third means, for controllably inverting the bit error corrected Hamming code produced by said third means;

fifth means, coupled to said second means, for controllably inverting the Hamming code stored therein;

sixth means, coupled to said second, third, fourth, and fifth means, and responsive to said first indication signal, for controlling said fourth means so that said fourth means inverts the bit error-corrected Hamming code produced by said third means and supplies the inverted-corrected Hamming code to said second means for storage therein, and for controlling said fifth means so that said fifth means inverts the inverted-corrected Hamming code stored in said second means and supplies the output of said fifth means to said third means; and seventh means, coupled to said sixth means and coupled to receive said first and second indication signals from said third means, for producing a third indication signal representative of whether or not the operation of said third means has accurately corrected an m-bit or less error in said Hamming code.

2. A data error corrrecting and detecting system according to claim 1, wherein for n-bits of said data, m is equal to one and the number k of said redundant bits is selected so as to satisfy the relationship $2^{k-1}-(n+k) \geq 0$.

3. A data error correcting and detecting system according to claim 1, wherein said seventh means comprises an OR gate coupled to receive said first and second indication signals, and an AND gate coupled to the output of said OR gate and to said third means, the output of said AND gate supplying said third indication signal.

4. A data error correcting and detecting system for correcting a single bit error and detecting a double bit error in said data comprising:

(a) a SEC-DED code generator circuit for receiving said data and for generating therefrom an SEC-DED code comprising n data bits and k redundant bits satisfying the relationship $2^{k-1}-(n+k) \geq 0$;

(b) memory control means;

(c) memory means, coupled to said SEC-DED code generator circuit, for storing said SEC-DED code under control of said memory control means connected thereto;

(d) an SEC-DED circuit for performing a first correction of a single bit error and a first detection of a double or more bit error of the SEC-DED code read out from said memory means;

(e) a single bit error detection line connected to said SEC-DED circuit for indicating the correction of a single bit error performed thereby;

(f) a multi-bit error detection line connected to said SEC-DED circuit for indicating the detection of a double or more bit error performed thereby;

(g) retrial control means connected to said SEC-DED circuit through said single bit error detection line and activated by a single bit error correction signal produced by said SEC-DED circuit;

(h) a first polarity inverter for inverting the SEC-DED code corrected in said SEC-DED circuit under control of said retrial control means connected thereto;

(i) said memory means storing the inverted SEC-DED code from said first polarity inverter under control of said memory control means connected between said memory means and said retrial control means and for controlling the write-in or reading-out of codes for said memory means;

(j) a second polarity inverter for inverting the SEC-DED code read-out from said memory means under control of said retrial control means connected thereto;

(k) said SEC-DED circuit detecting any error in the SEC-DED code produced by said second polarity inverter; and (l) a miscorrection detecting circuit, coupled to said SEC-DED circuit and said retrial control means, for detecting whether the correction for a single bit error is corrected or not as a result of the error detection in said SEC-DED circuit.

5. A data error correcting and detecting system according to claim 4 wherein said miscorrection detecting circuit comprises an OR gate having said single bit error detection line and said multi-bit error detection line connected as inputs thereto, and an AND gate having a retrial control signal from said retrail control means and the output from said OR gate as inputs thereto, whereby whether correction for a single bit error has been correct or not is determined according to whether the output from the AND gate is in a prescribed binary state.

6. A data error correcting and detecting system according to claim 5, wherein the binary state of the output of said AND gate is such that an accurately corrected SEC-DED code provided by said SEC-DED circuit is employed as data, while an erroneously corrected SEC-DED code is determined to contain a triple bit error and is not employed as data.

* * * * *